ved July 23, 1963

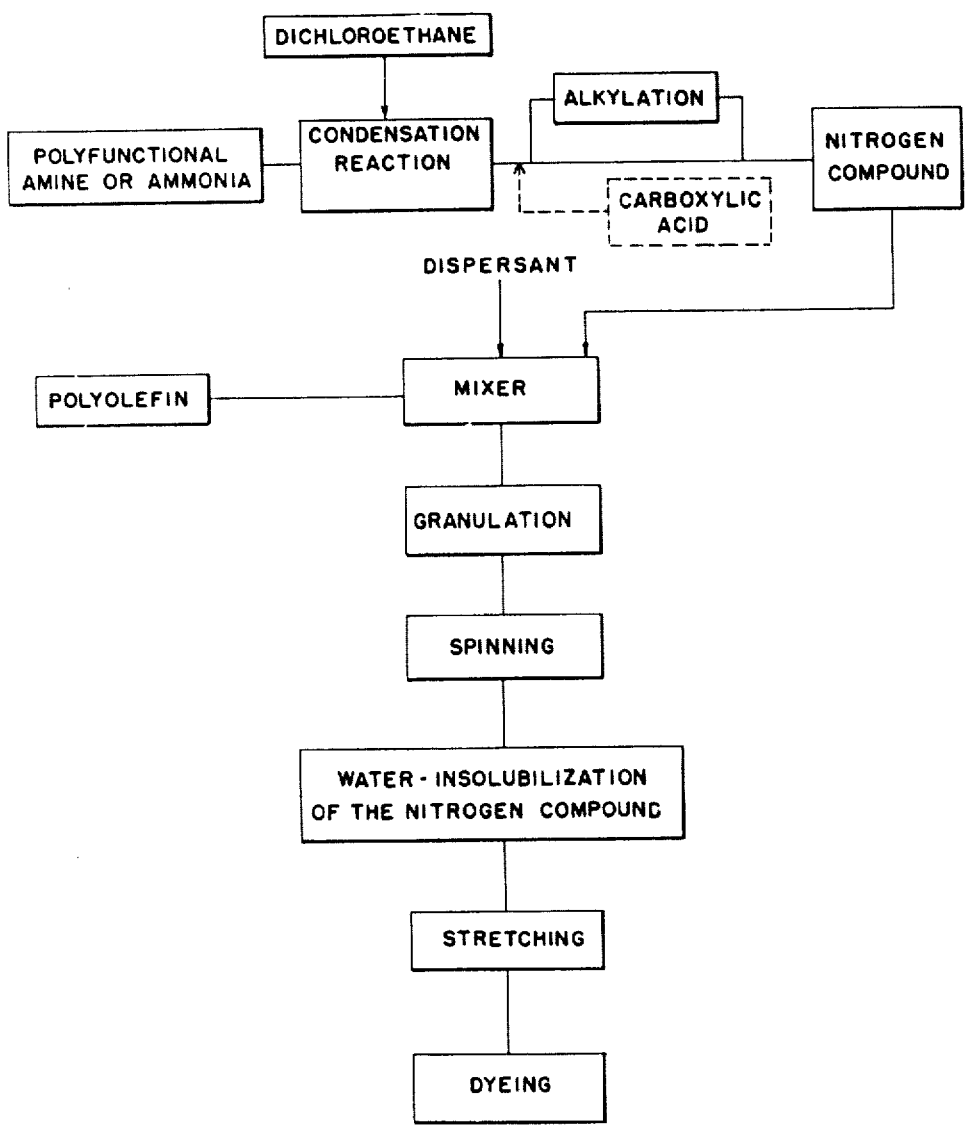

3,098,697
PROCESS FOR PREPARING POLYOLEFIN FIBRES OF IMPROVED DYE RECEPTIVITY
Vittorio Cappuccio and Ubaldo Riboni, Terni, and Carlo Viganó, Milan, Italy, assignors to Montecatini-Società Generale per l'Industria Mineraria e Chimica, Milan, Italy, an Italian corporation
Filed Jan. 17, 1961, Ser. No. 83,141
Claims priority, application Italy Jan. 21, 1960
10 Claims. (Cl. 18—54)

The present invention relates to the preparation of textile fibers made up essentially of crystalline polyolefins obtained by low-pressure polymerization, such as polyethylene, polypropylene, polybutene or mixtures of these polymers.

In Italian Patent No. 587,008, there is illustrated the preparation of dyeable fibers by extrusion of mixtures of polyolefins with various tinctorial modifiers, e.g., certain basic nitrogen compounds.

According to a feature of the present invention, it has been surprisingly found that textile fibres with a particular affinity for dyes are obtained by extruding mixtures containing polyolefins and 0.5 to 25% by weight of basic nitrogen compounds having a resinous character; these compounds being prepared by reacting dichloroethane with polyfunctional amines or ammonia and, then, if desired, by alkylating the reaction product.

The drawing shows a self-explanatory representation of a spinning and dyeing technique employing the present invention.

Polyfunctional amines, such as hexamethylenediamine, ethylenediamine, 1,2 - propylenediamine, diethylenetriamine and the like are particularly suitable.

As the alkylating agents, alkyl halides such as lauryl chloride, cetyl chloride, stearyl chloride, octadecyl chloride and the like are particularly useful in the present invention.

The condensation reaction between the polyfunctional amine and dichloroethane can be carried out employing 1 mole of dichloroethane to 0.01 to 2.5 mols of polyfunctional amine. Amounts of polyfunctional amine lower than 0.01 mol cause undesirable cross-linking phenomena in the condensation product which results in the product becoming infusible and therefore unusable for the purposes of the present invention.

The above mentioned alkyl halides can be used in an amount from 0.01 to 2 mols per mol of dichloroethane.

A preferred composition is represented by a mixture of polypropylene with 4% of a condensation product obtained by reacting 1 mole of dichloroethane with 1.25 mols of hexamethyldiamine and 0.5 mol of lauryl chloride.

Compounds obtained by the condensation of diethylenetriamine with dichloroethane in molar ratios of amine to dichloroethane of between 1:2.5 and 1:0.5 (i.e., from 0.4 to 2 mols of amine per mol of dichloroethane) respectively, or by the condensation of ammonia and/or diethylenetriamine with dichloroethane in the molar ratio of 1:0.5 or below are also especially suitable.

The above mentioned basic nitrogen products contain variable proportions of nitrogen, present as primary, secondary or tertiary nitrogen, depending on the groups, i.e., $-NH_2$, $-NH$, $-N$, bound to the carbon atoms of the chains.

Particularly useful in the present invention are condensation products having a nitrogen content between 32% and 25%, measured either by the Kijedohl's system or by potentiometric titration. These basic nitrogen-containing compounds may be pasty liquid or rubbery products whose solubility in water decreases scalarly thus forming products which only swell giving jelly-like masses.

The aforementioned basic nitrogen-containing compounds can be also obtained by the condensation of dichloroethane with triethylenetetramine, tetraethylenepentamine or higher homologues of this series.

The reaction or condensation between the amine compound and dichloroethane may be carried out either in the presence or absence of solvents or condensing agents.

The mixture of the nitrogen product with the polyolefin or polyolefins is obtained by agitating them at room temperature either in Werner-type mixers, ball-mixers or in similar apparatus. The mix is granulated by melting in a device provided with a screw, and is then broken and finally extruded in a melt spinning device.

The polyolefin can also be homogeneously impregnated with a solution of the nitrogen product, thereafter removing the solvent.

The spinning of the mixes can conveniently be carried out in the presence of a small amount of a "solid dispersant" which facilitates the homogeneous dispersion of the nitrogen product in the polymer mass and is preferably selected from the group consisting of cetyl alcohol, stearyl alcohol, stearic acid, terephthalic acid, benzoin, furoin, vinyl stearate, mono-, di- and tri-stearic esters of glycerol, monoethanolamine stearate, stearic amide, N-diethanol lauramide, $C_6$–$C_{30}$ aliphatic amines, condensation products of ethylene oxide with alcohols, amines and phenols, polystearamide, polyacrylic acid, polystyrene and styrene copolymers, terpene polymers, etc.

The fibres obtained by extrusion of the mixes according to the present invention can be mono-filaments or plurofilaments and are employed for preparing continuous or staple yarns or for preparing bulky yarns or staple.

The mono- or pluro-filaments obtained according to the present invention can also be subjected to treatments which render the basic nitrogen compound water-insoluble.

Compounds particularly suitable for use in such treatments are formaldehyde, diisocyanates, such as phenyldiisocyanate and toluenediisocyanate, diepoxy compounds (ethylene-glycoldiglycidylether, diepoxybutane etc.), and crosslinking agents such as divinyl benzene and the like. These treatments may be carried out before or after stretching.

The stretching is carried out using stretching ratios between 1:2 and 1:10 at temperatures between 80° and 150° C., in stretching devices heated by hot air, steam or a similar fluid.

It has been found advantageous to treat the fibres in an aqueous formaldehyde bath or, preferably with formaldehyde vapour at 110–120° C. for about 10 minutes in order to fix the modifying agent in the fibre.

By the contacting of the fibres with the decomposition gases obtained by heating paraformaldehyde to about 150° C., the nitrogen compound modifying agent contained in the fibre is fixed in an even more stable and quantitatively higher manner.

The fibres thus obtained are subjected to dyeing with acid, metallized, disperse or vat dyes.

The following examples are given to illustrate the present invention without limiting its scope.

EXAMPLE 1

1160 g. of hexamethylenediamine are dissolved in 1800 cc. of water at room temperature while agitating the mass in a 6-litre glass vessel. The solution is heated to 90° C. and 897 g. of dichloroethane and a 50% aqueous NaOH solution (725 g.) are added contemporaneously. When the addition is completed, the reacting is continued at 90° C. for 3 hours. The vessel is then cooled to 20-25° C. so as to separate an upper solid layer from a lower aqueous layer (containing NaCl). The aqueous layer is removed.

200 cc. of water are added to the residual solid mass. The whole is then heated to 70-80° C. for 1 hour while agitating.

The mass is decanted again and the aqueous layer is removed. The water remaining in the condensate is then removed by distillation under reduced pressure. The product, obtained with yields of 92-94%, is ready to be used in admixture with polypropylene in the preparation of fibres.

1.300 g. of the nitrogen-containing condensate (3.5%) are dissolved in 1300 cc. of methanol and 36.0 kg. of polypropylene ($[\eta]=1.25$ (measured in tetrahydronaphthalene at 135° C.), ash content=0.06%, residue after heptane extraction=95.5%) are added. As is known to the art subsequent to the discoveries of G. Natta, the heptane residue indicates the presence of isotactic macromolecules; a distinguishing characteristic of isotactic polypropylene macromolecules being their insolubility in and non-extractability with heptane. The particular crystallinity of this polypropylene is therefore due to the presence of isotactic macromolecules. Alcohol is removed by drying at 60° C. in a mixer connected to a vacuum pump. The product is then granulated by extrusion in a screw device at 160° C.

The granulate is spun under the following conditions:

Spinneret type_____ 60/0.8 x 16
Screw temperature_____° C__ 230
Head temperature_____° C__ 220
Spinneret temperature_____° C__ 210
Maximum pressure_____kg./cm.$^2$__ 25
Winding speed_____m./minute__ 320

The fibre leaving the spinneret is wetted with a 10% aqueous solution of ethylene glycol diglycidyl ether. It is then stretched in the presence of steam with a stretching ratio of 1:6.4 and is finally crimped and cut.

The fibre possesses the following serimetric characteristics:

Tenacity _____g./denier__ 3.07
Elongation _____percent__ 29

It is then subjected to dyeing with the following acid, metallized, disperse and vat dyes, obtaining shades having very good intensity and fastness to washing, rubbing and light:

| | Colour Index Numbers |
|---|---|
| Solid Yellow 2G (acid) | 18965. |
| Wool Red B (acid) | 27200. |
| Alizarine Blue ACF and BV (acid) | 63010. |
| Acid Black IVS (acid) | 20470. |
| Lanasyn Red 2GL (metallized) | Acid Red 216. |
| Diachrome Yellow 2G (chromium) | 14010. |
| Setacyl Yellow 3G (plastosoluble) | Disperse Yellow 20. |
| Cibacet Scarlet BR (plastosoluble) | Disperse Red 18. |
| Romantrene Yellow GCN (vat) | 67300. |
| Romantrene Brilliant Pink R (vat) | 73360. |
| Romantrene Brilliant Blue R (vat) | 69800. |
| Alizarine Green G | 61570. |
| Diachromate Orange E | |
| Diachromate C | |
| Acetoquinone Blue RHO (plastosoluble) | |

EXAMPLE 2

Four different condensation products are prepared by operating as described in Example 1, with the molar ratios reported in the following Table 1. The spinning conditions are shown in Table 2.

The fibres obtained give very intense shades, having a good fastness to washing, rubbing and light, when dyed with the dyes of Example 1.

Table 1
SYNTHESIS OF THE TINCTORIAL MODIFIER

| Dichloroethane | 990 g. (1 mole). | 990 g. (1 mole). | 990 g. (1 mole). | 990 g. (1 mole). |
|---|---|---|---|---|
| Polyfunctional amine (hexamethylene diamine) | 1.540 g. (1.33 moles). | 1.355 g. (1.15 mols). | 1.355 g. (1.15 mols). | 1.241 g. (1.07 mols). |
| Alkylating agent | lauryl chloride 510 g. (0.25 mol). | lauryl chloride, 1.180 g. (0.58 mol). | stearyl chloride, 884 g. (0.3 mol). |  |

Table 2
PREPARATION OF FIBRES FROM MIXES CONTAINING POLYPROPYLENE AND 4% OF MODIFIER

| Polypropylene $[\eta]$ | 1.3 | 1.3 | 1.3 | 1.3 |
|---|---|---|---|---|
| Ash content, percent | 0.067 | 0.067 | 0.067 | 0.067 |
| Residue after heptane extraction, percent | 95.5 | 95.5 | 95.5 | 95.5 |
| Spinneret | 60/0.8 x 16 | 60/0.8 x 16 | 60/0.8 x 16 | 60/0.8 x 16 |
| Screw temperature, °C | 230 | 230 | 230 | 230 |
| Head temperature, °C | 220 | 220 | 220 | 220 |
| Spinneret temperature, °C | 210 | 210 | 210 | 210 |
| Highest pressure (kg./cm.$^2$) | 29 | 37 | 25 | 34 |
| Winding speed (m./min.) | 270 | 225 | 310 | 250 |
| Sizing | ethylene glycol diglycidyl ether (10% aqueous solution) | | | |
| Stretching ratio (in the presence of steam) | 1:6 | 1:6.2 | 1:5.9 | 1:6 |
| Tenacity of the fibre (g./den.) | 3.12 | 3.51 | 3.7 | 3.1 |
| Elongation, percent | 33 | 25 | 22 | 35 |

EXAMPLE 3

An intimate mixture of 95 g. of polypropylene (having an intrinsic viscosity $[\eta]$ of 0.96 (determined in tetrahydronaphthalene at 135° C.), a residue after heptane extraction of 88% and an ash content of 0.02% and 5 g. of a polyamine is prepared in a conventional resin mixer. The basic nitrogen product is obtained as follows: 103 g. (1 mole) of diethylenetriamine, 160 ml. of water and 99 g. (1 mole) of symmetric dichloroethane are changed into a glass flask provided with a stirrer and a reflux condenser. The mixture is refluxed for 10 hours. As the condensation proceeds, the Cl ions thus released are neutralized with a 15% sodium hydroxide solution. During the reaction period of 10 hours, 470 g. of a 15% sodium hydroxide solution are added. Water is distilled off and NaCl is separated by filtration. The residue consists of a thick oily product, having a nitrogen content of 29.8%, which product is purified by separating the unreacted diethylenetriamine using vacuum distillation.

During the mixing of the condensation product and polypropylene, the mixer rolls rotate at different speeds and are heated to 130° C. The product is passed several times through the mixer while the scraper is kept lowered and the rolls are kept close together.

The working time is 8 minutes. A product consisting of friable chips is obtained and charged directly into the spinning apparatus heated to 225° C. The fibre is subjected to stretching in a hot room with a ratio of 1:5 and is then placed in a flask, which is heated to 110° C., and provided with a breather pipe, which is connected with another flask containing paraformaldehyde heated to 150° C. At this temperature, the paraformaldehyde is decomposed with the formation of gaseous aldehyde. The treatment is continued for 10 minutes and the fibre is then discharged and placed in a ventilated thermostat maintained at 75° C. for 1 hour. The fibre thus obtained is dyed with the following dyes: light solid yellow (Acid Yellow 11, No. 188820, Colour Index) and Wool Red B (Acid Red 115, No. 27200, Colour Index). There is obtained intense shades which are fast to soaping.

EXAMPLE 4

By operating as in Example 3, 96.5 parts of polypropylene ($[\eta]=1.1$, residue after heptane extraction=92%, ash content=0.02%) are mixed at 150° C. in a roll mixer with 3.5 parts of a nitrogen product obtained as follows:

103 g. (1 mole) of diethylenetriamine, 160 ml. of water and 148.5 g. (1.5 mols) of symmetric dichloroethane are charged into a glass flask provided with a stirrer and a reflux condenser and the whole mass is refluxed for 14 hours, while progressively neutralizing the thus freed chloride ions with sodium hydroxide. 670 g. of a 15% sodium hydroxide solution are employed in the neutralization. Water is distilled off and NaCl is separated. In order to facilitate the elimination of NaCl, after distillation of about 500 ml. of water and filtration, 100 g. of diethylenetriamine are added as a solvent. Water is removed completely, the salt is filtered and diethylenetriamine is vacuum distilled. The residue is a pasty product having a nitrogen content of 27%. It is only partially soluble in water, as gels are formed.

The preparation of the polyamine and polypropylene mix is continued as described in Example 3. The mix is spun at 260° C., and the fibre is treated for 10 minutes with gaseous formaldehyde, washed in an aqueous bath at 40° C. and dried in a thermostat kept at 75° C. The fibre thereby obtained is odorless and is dyed with the following dyes:

Alizarine Blue BV (Acid Blue 45, No. 63010, Colour Index),
Wool Red B (Acid Red 115, No. 27200, Colour Index), and
Diachromate Orange E.

Shades possessing a good fastness to soaping are thus obtained.

EXAMPLE 5

In the manner of Example 4, 90 parts of polypropylene ($[\eta]$ of 1.2, residue after heptane extraction of 94%, ash content=0.02%) are mixed at 150° C. with 10 parts of a nitrogen product obtained as follows:

51.5 g. of diethylenetriamine (0.5 mols), 100 ml. of water and 99 g. of symmetric dichloroethane are charged into a flask provided with a stirrer and a reflux condenser. The mixture is refluxed for 15 hours while neutralizing the Cl ions, as in the preceding examples, with 406 g. of a 15% sodium hydroxide solution.

Water is distilled off. NaCl is separated, as in Example 4, obtaining a product with a rubbery appearance which is difficultly and only partially soluble in water and has a nitrogen content of 25.1%.

After mixing with a polyolefin, as in the preceding examples, the mix is spun at 260° C. and stretched. The fibre, after a treatment with formaldehyde, is washed and dried, as in Example 4, and is dyed with the following:

Wool Red B,
Acid Black IVS (Acid Black 1, No. 20470, Colour Index), and
Alizarine Green G (Acid Green 25, No. 61570, Colour Index).

Fibres having very intense shades, with a good fastness to soaping, are obtained.

EXAMPLE 6

A mixture is prepared from 94 parts of polypropylene ($[\eta]=1.25$, residue after heptane extraction=94%, ash content=0.067%) and 6 parts of an amide product, obtained by condensing the nitrogen product of Example 4 with the same weight of salicylic acid until a given amount of water has been eliminated (1 mole per mole of salicylic acid, using xylene as carrier solvent).

The amide product is a clear almost yellow mass, which can be easily ground and is soluble in methanol.

The spinning mixture is prepared by wetting the polypropylene powder with an alcohol solution of the amide product modifier and then evaporating the solvent.

The mixture thus obtained is charged directly in the spinning apparatus heated to 225° C.

The fibre, after being subjected to stretching using stretching ratio of 1:4.5 at 150° C. and to the insolubilization treatments for the amide modifiers using formaldehyde or ethyleneglycoldiglycidylether, possesses a good thermal stability and a very good receptivity for acid dyes. Fibres possessing intense, brilliant shades of a good color fastness are obtained.

EXAMPLE 7

A mixture is prepared from 94 parts of polypropylene ($[\eta]=1.30$, residue after heptane extraction=97%, ash content=0.06%) and 6 parts of an amide product. The amide product is obtained by condensing the nitrogen product of Example 3, with the same weight of stearic acid until an amount of water corresponding to 1 mole per mole of acid is eliminated, while using xylene as carrier solvent.

The amide modifier compound is a wax-like mass soluble in methanol. It is dispersed in the resin by means of an alcohol solution and the solvent is then eliminated by evaporation.

The mixture is spun in a chamber extruder heated to 225° C. The fibre is subjected to stretching in air at 150° C. using a stretching ratio of 1:5 and to cross-linking treatments with an aldehyde or diepoxide solution as in Example 6.

The receptivity of the fibre to acid dyes is remarkable, for intense, brilliant shades with a good fastness are obtained.

EXAMPLE 8

A fibre is prepared from a mixture of 94 parts of polypropylene of Example 6, and 6 parts of an amide product obtained reacting a nitrogen product (prepared by condensation of diethylenetriamine with dichloroethane such as that of Examples 3 and 7) with lauric acid as indicated in the preceding example.

The fibre after being stretched and treated with the insolubilization baths for the modifier as in Example 6, possesses a good receptivity to acid dyes. Fibres of solid, intense and brilliant shades are obtained.

Many variations and modifications can of course be made without departing from the spirit of the present invention.

Having thus described the present invention, what it is desired to secure and claim by Letters Patent is:

1. In a process for preparing polyolefin fibres of improved dye receptivity by the extrusion of polyolefins, the improvement which comprises admixing at least one polyolefin prior to extrusion with 0.5 to 25%, based on the weight of the polyolefin, of a basic nitrogen-containing condensation product obtained from dichloroethane and 0.01 mol to 2.5 mols per mol of dichloroethane of a compound selected from the group consisting of polyfunctional amines and ammonia, and extruding the resulting mixture to produce the fibre.

2. A process according to claim 1, wherein the polyolefin is selected from the group consisting of polyethylene, polypropylene, polybutene and mixtures thereof.

3. A process according to claim 1, wherein the polyolefin is polypropylene containing isotactic polypropylene macromolecules.

4. A process according to claim 1, wherein said polyfunctional amine is selected from the group consisting of hexamethylenediamine, diethylenetriamine, propylenediamine, ethylenediamine and mixtures thereof.

5. A process according to claim 1, wherein prior to extrusion said basic nitrogen-containing condensation product is contacted with a carboxylic acid selected from the group consisting of stearic acid, salicylic acid and lauric acid.

6. A process according to claim 1, wherein prior to extrusion said basic nitrogen-containing condensation product is alkylated with an alkyl chloride selected from the group consisting of lauryl chloride, cetyl chloride, octadecyl chloride and stearyl chloride.

7. A process according to claim 6, wherein between 0.01 to 2 mols of alkyl chloride per mol of dichloroethane are employed.

8. A process according to claim 1, wherein the extruded fibre is contacted with a member selected from the group consisting of formaldehyde, isocyanate compounds and diepoxy compounds in order to render said basic nitrogen-containing condensation product water insoluble and fix said product in the fibre.

9. A composition suitable for preparing dye-receptive fibres comprising (1) a polyolefin and (2) 0.5 to 25%, based on the weight of the polyolefin, of a basic nitrogen-containing condensation product obtained from dichloroethane and 0.01 mol to 2.5 mols per mol of dichloroethane of a compound selected from the group consisting of polyfunctional amines and ammonia.

10. The composition of claim 9, wherein said polyolefin is polypropylene containing isotactic polypropylene macromolecules.

References Cited in the file of this patent

UNITED STATES PATENTS

| | | |
|---|---|---|
| 2,265,559 | Watkins | Dec. 9, 1941 |
| 2,307,973 | Tischbein | Jan. 12, 1943 |
| 2,352,328 | Kleine | June 27, 1944 |

UNITED STATES PATENT OFFICE
CERTIFICATE OF CORRECTION

Patent No. 3,098,697                                  July 23, 1963

Vittorio Cappuccio et al.

It is hereby certified that error appears in the above numbered patent requiring correction and that the said Letters Patent should read as corrected below.

Column 3, line 4, for "200 cc." read -- 2000 cc. --.

Signed and sealed this 7th day of April 1964.

(SEAL)
Attest:

ERNEST W. SWIDER

Attesting Officer

EDWARD J. BRENNER

Commissioner of Patents